United States Patent [19]

Hoback et al.

[11] 3,714,131
[45] Jan. 30, 1973

[54] POLYAMIDEIMIDES

[75] Inventors: John T. Hoback; Fred F. Holub, both of Schenectady, N.Y.

[73] Assignee: General Electric Company, Schenectady, N.Y.

[22] Filed: Aug. 11, 1971

[21] Appl. No.: 171,012

[52] U.S. Cl. ........260/78 TF, 117/132 B, 117/161 P, 260/32.8 M, 260/33.4 P, 260/33.6 R, 260/47 CP, 260/65.78 UA
[51] Int. Cl. ............................................C08g 20/32
[58] Field of Search ......................260/78 UA, 78 TF

[56] References Cited

UNITED STATES PATENTS

| | | | |
|---|---|---|---|
| 3,277,043 | 10/1966 | Holub | 260/78 X |
| 3,407,176 | 10/1968 | Loncrini | 260/78 X |
| 3,480,588 | 9/1969 | Lavin et al. | 260/78 X |
| 3,575,924 | 4/1971 | Bargain | 260/78 X |
| 3,576,691 | 4/1971 | Meyers | 260/78 X |
| 3,652,511 | 3/1972 | Vincent et al. | 260/78 |
| 3,661,852 | 5/1972 | Flowers et al. | 260/78 X |
| 3,678,015 | 7/1972 | Holub et al. | 260/78 |

*Primary Examiner*—Howard E. Schain
*Attorney*—Howard I. Schlansker et al.

[57] ABSTRACT

New and useful polyamideimides and their precursor polyamic acids are provided. The polyamic acid is prepared by reacting aliphatic diacid, tricarboxylic acid anhydride and polyamine material and further reacting this reaction product with organic dianhydride, aliphatically unsaturated organic anhydride and polyamine including polymethylene polyaniline. The polyamic acid is cured to provide the final polyamideimide which is useful for coating, adhesive, laminating, molding and other fabrications.

5 Claims, No Drawings

POLYAMIDEIMIDES

This invention relates to new and useful polyamideimides and their precursor polyamic acids. More particularly, the invention relates to polyamic acids which are prepared by reacting aliphatic diacid with tricarboxylic anhydride and polyamine material and further reacting this reaction product with organic dianhydride, aliphatically unsaturated organic anhydride and polymethylene polyaniline, the polyamideimide being obtained by curing the polyamic acid.

The use of polyamideimides as high temperature-resistant coating and electrical insulating materials is well known, such compositions being shown, for example, in U.S. Pat. Nos. 3,179,635; 3,471,444; 3,554,984; 3,555,113; 3,562,217 and 3,576,691, among others. However, despite the availability of such materials, there continues a search for new and useful polyamideimides and their precursor polyamic acids which can be readily prepared, applied to substrates or otherwise easily used and cured to provide coatings and the like having good flexibility resistance to abrasion, good electrical qualities, and generally high temperature-resistant characteristics.

It is a primary object of this invention to provide new and improved polyamic acids and polyamideimides. According to the invention, the polyamic acid is prepared by first reacting in a relatively inexpensive solvent aliphatic diacid, tricarboxylic acid anhydride and polyamine material, this first reaction product then being reacted with organic dianhydride, aliphatically unsaturated organic anhydride and polyamine, including polymethylene polyaniline to provide polyamic acid which is cured in the usual manner to the final polyamideimide resin state. Generally speaking, in the first reaction, one mole of acid material is used for each two moles of polyamine material, these amounts being variable by about fifteen mole percent. Up to about 95 mole percent of the diacid is replaced with an equivalent amount of tricarboxylic acid anhydride or ester. In the second reaction, there is reacted with the first reaction product plus an amount of polyamine equivalent to five mole percent of the first reaction product an equivalent amount of dianhydride and aliphatically unsaturated anhydride. At least five equivalent percent of the polyamine added in the second reaction is polymethylene dianiline.

Those features of the invention which are believed to be novel are set forth with particularity in the claims appended hereto. The invention will, however, be better understood and further objects and advantages thereof appreciated from a consideration of the following description.

As pointed out above, a drawback of many of the prior art materials of this general type has been that they require the use of relatively expensive solvents such as N-methylpyrrolidone, dimethylacetamide, pyridine, n-methyl-caprolactam, dimethyl sulfoxide, and the like. While the present reactions can be carried out using such solvents, it is one of the advantages of the present invention that relatively inexpensive solvents can be used. For example, cresylic acids which are generally a mixture of ortho-, meta-, and para-cresol can be used as can such other materials such as cyclohexanone, acetophenone, and the like. Also useful in connection with the present invention are what are so-called high boiling hydrocarbon solvents, such materials including, among others, Solvesso 100 which is a mixture of mono-, di- and trialkyl (primarily methyl) benzenes having a flash point of about 113° F and a distillation range of from about 318° to 352° F, such solvent being made by the Humble Oil Company. Another solvent useful in the present connection is Humble 670 solvent, a mixture of mono-, di-, and trialkyl (primarily methyl) benzenes having a gravity API 60° F of 31.6 percent, a specific gravity of 60° F of 0.8676, a mixed aniline point of 11° F and a distillation range of about 288° to 346° F.

The aliphatic diacids useful in the present connection can be expressed by the formula

I     HOOC — R — COOH where R is an unsaturated or saturated, substituted or unsubstituted, aliphatic group containing from about one to 40 carbon atoms. Among such diacids are oxalic, maleic, succinic, glutaric, adipic, pimelic, suberic, azelaic, sebacic and dodecanedioic acids, as well as unsaturated acids falling within the above formula including maleic and fumaric acids, among others. Mixtures can, of course, be used. A dibasic acid having a chain thirty-six carbons long is Emery Industries, Inc. 3713-R Dimer Acid. Others will occur to those skilled in the art.

Up to about 50, preferably up to about 20, equivalent percent of the aliphatic diacid can be substituted with aromatic diacids, typical of which are terephthalic and isophthalic acids as well as aromatic anhydrides. The tricarboxylic acid anhydride can be expressed by the following formula:

II 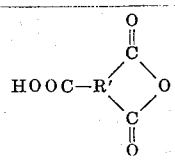

where R' is a trivalent organic radical. Among such materials which will occur to those skilled in the art are trimellitic anhydride; 2,6,7-naphthalene tricarboxylic anhydride, 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene-3,3',4-tricarboxylic anhydride; 3,4,10-propylene tricarboxylic anhydride; 3,4-dicarboxyphenyl-3-carboxyphenyl ether anhydride; ethylene tricarboxylic anhydride; 1,2,5-naphthalene tricarboxylic anhydride, etc. Also useful are the corresponding acids of such anhydrides. Where diacids are mentioned, such substitutions will be understood to be included.

In lieu of the tricarboxylic acid anhydride material, there can be used in whole or in part the reaction product of such materials with glycol having the formula III 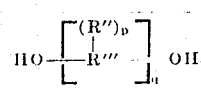

where R'' is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.), as well as monovalent hydrocarbon radicals containing inert substituents thereon, such as halogen (chlorine, bromine, fluorine, etc.). It will be understood that where more than one R'' is used, they may be alike or different. R''' can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. R''' can also be a silane radical or can be polyalkoxy such as polyethoxy, polypropoxy, polythioethoxy, polybutoxy, polyphenylethoxy, or polyorganosiloxy, for example, polydimethylsiloxy, polydiphenylsiloxy, polymethylphenylsiloxy, etc. R''' can also consist of two or more alkylene or alkylidene groups such as above, separated by an aromatic group, a tertiary amino group, an ether group, a carbonyl group, a silane group, or by a sulfur containing group such as sulfide, sulfoxide, sulfone, etc. R''' may also be a glycol dibasic acid ester residue derived from, for example, dibasic acids such as adipic, azelaic, sebacic, isophthalic, terephthalic and glycols such as have been disclosed above. Other groupings which can be represented by R''' will occur to those skilled in the art. The ester residue can be polymeric or monomeric. The subscript p can be a whole number including zero. The subscript q is an integer which may be varied as desired and R''', where q is more than 1, may be like or different radicals. It is understood, of course, that mixtures of different glycols may be used and where glycol is mentioned, such mixtures are considered to be included.

Such reaction products of tricarboxylic acid anhydride and glycol can be expressed by the formula IV 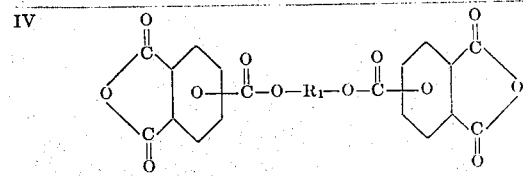

where $R_1$ is a divalent hydrocarbon radical, preferably containing from two to 12 carbon atoms.

The polyamines useful in connection with the present invention are well known and can be expressed by the formula V  $X - R_2 - (NH_2)_n$ where $R_2$ is an organic radical and n is at least 2 and X is hydrogen, an amino group or substituted or unsubstituted organic group including those also containing at least one amino group. The specific amines useful for the present invention, alone or in admixture, include but are not limited to the following:

p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O)CH_2)_2O(CH_2)_3NH_2$
$H_2N(CH_2)_3S(CH_2)_3NH_2$
$H_2N(CH_2)_3N(CH_3)(CH_2)_3NH_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline of formula IV 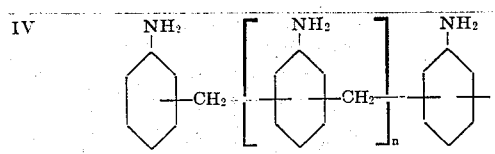

where n is from 0.1 to 10.

Dianhydrides expressed by the formula

V 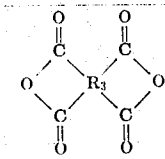

where $R_3$ is a tetravalent radical containing at least two carbon atoms selected from substituted and unsubstituted aliphatic, cycloaliphatic, heterocyclic, aromatic groups and combinations thereof which can be utilized alone or in admixture as a constituent of the anhydride mixture to be reacted with the diacid-polyamine reaction product include but are not limited to pyromellitic dianhydride
2,3,6,7-naphthalene tetracarboxylic dianhydride 3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
bis(3,4-dicarboxyphenyl)sulfone dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride
3,3',4,4'-diphenyltetracarboxylic dianhydride
3,4,3',4'-benzophenone tetracarboxylic dianhydride
azobenzene tetracarboxylic dianhydride
2,3,4,5-tetrahydrofuran dianhydride
p-phenylenebis(trimellitate)anhydride
1,2-ethylenebis(trimellitate)anhydride
2,2-propanebis(p-phenylene trimellitate)anhydride
4,4'-[p-phenylenebis(phenylimino)carbonyl diphthalic] anhydride
4,4'-diphenylmethanebis(trimellitamide)anhydride
and mixtures thereof.

The aliphatically unsaturated organic anhydrides useful in the present respect can be expressed by the formula VI 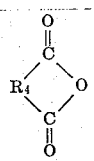

where $R_4$ is an aliphatically unsaturated divalent organic radical selected from VII 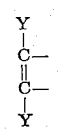

VIII 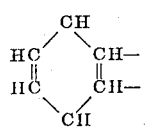

IX 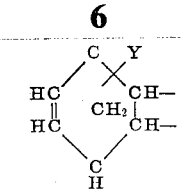

where Y is a radical selected from hydrogen, lower alkyl, halogen, or mixtures thereof, such as chloromethyl, ethyl, propyl, bromo, and the like.

The following examples will illustrate the practice of the invention, it being understood that they are not to be taken as limiting in any way. All parts are by weight.

EXAMPLE 1

There were mixed together in a resin kettle equipped with a stirrer, a Dean Stark trap with condenser, and a thermometer 198.26 parts p,p'-methylene dianiline, 62.79 parts azelaic acid, 64.17 parts trimellitic anhydride and 36.13 parts cresol, about 39 parts of xylene being placed in the Dean Stark trap to assist in removing water. The mixture was heated at 190° C until the water stopped azeotropically distilling, 21 parts of water being removed along with the xylene. To this product there were added about 387.2 parts cresol to make a solution containing 43.5 percent solids.

Shown in Table I below are various reactions carried out using the indicated amounts of the product of Example 1, all reactions being carried out in mixtures containing 20 percent solids, the mixture being heated from about 80° to 120° C.

TABLE I

| Ex. | Added Cresol | Ex. 1 | Ex. 1 Solids | Curithane 103 | MA | Nadic Anhydride | BTDA |
|---|---|---|---|---|---|---|---|
| 1a | 35.7 | 18.66 | (8.11) | 0.206 | | 0.32 | 2.9 |
| 1b | 33.9 | 16.79 | (7.3) | 0.41 | | 0.65 | 2.6 |
| 1c | 32.2 | 14.7 | (6.39) | 0.61 | | 0.97 | 2.2 |
| 1d | 33.8 | 16.8 | (7.3) | 0.41 | | 0.32 | 2.9 |
| 1e | 33.8 | 16.8 | (7.3) | 0.41 | | 0.97 | 2.2 |
| 1f | 33.9 | 16.3 | (7.3) | 0.4 | 0.4 | 0.97 | 2.6 |

MA=maleic anhydride
BTDA=benzophenone dianhydride

All of the reaction products of Examples 1a through 1f above coated smoothly on aluminum to provide a high temperature-resistant film after curing for ten minutes at 250° C.

EXAMPLE 2

There were charged into a resin kettle equipped with a stirrer, a Dean Stark trap with condenser and a thermometer 198.26 parts p,p'-methylenedianiline, 62.79 parts azelaic acid, 136.94 parts 4,4'-ethylene-bis-anhydro-trimellitate (TMA-EG) and 43.32 parts cresol. About 39 parts xylene were placed in the trap to help remove water. The mixture was heated at 190° C until the water stopped azeotropically distilling. The theoretical amount of water was removed along with the xylene. About 517 parts of cresol were added to this product to make a solution containing 40 percent solids.

Shown in Table II below are various reactions carried out using the indicated amounts of the product of Example 2 along with the other indicated materials. All of the following reactions were carried out in mixtures containing 20 percent solids in a flask equipped with a stirrer, thermometer and a condenser with $N_2$ bypass. After heating from 80° to 110° C over 5–10 minutes, all gave a good flexible film on aluminum with curing 10 to 20 minutes at 250° C.

TABLE II

| Example | Added cresol | Ex. 2 | Ex. 2 solids | Curithane #103 | PMDA | BTDA | MA | Cutthru, °C. |
|---|---|---|---|---|---|---|---|---|
| 2a | 48.44 | 22.43 | 8.97 | 0.41 | | 2.6 | 0.4 | 320 |
| 2b | 43.94 | 22.43 | 8.97 | 0.41 | 1.74 | | 0.4 | 350 |
| 2c | 42.57 | 19.8 | 7.92 | 0.61 | 1.96 | | 0.4 | 385 |

PMDA = pyromellitic dianhydride.

EXAMPLE 3

There were charged into a resin kettle equipped as in Example 2, 198.26 parts p,p'-methylene dianiline, 136.94 parts TMA–EG, 21.6 parts isophthalic acid and 38.35 parts azelaic acid. About 39 parts xylene were placed in the trap to help remove the water. The mixture was heated at 190° C until the water stopped azeotropically distilling. The theoretical amount of water was removed along with the xylene. About 513 parts cresol were added to this product to make a solution containing 40 percent solids.

Shown in Table III below are certain reactions carried out using the product of Example 3. All of the following reactions were carried out in mixtures containing about 20 percent solids in a flask equipped with a stirrer, thermometer and a condenser with $N_2$ bypass. After heating from 80° to 110° C over 5–10 minutes, all gave a good flexible film on aluminum with curing 10–20 minutes at 250° C.

TABLE III

| Example | Added cresol | Ex. 3 | Ex. 3 solids | Curithane $103 | BTDA | MA | Cutthru, °O. |
|---|---|---|---|---|---|---|---|
| 3a | 48.03 | 22.28 | 8.91 | 0.41 | 2.6 | 0.4 | 290 |
| 3b | 48.53 | 22.28 | 8.91 | 0.41 | 2.9 | 0.2 | 315 |
| 3c | 43.57 | 19.80 | 7.92 | 0.61 | 2.2 | 0.4 | 340 |

EXAMPLE 4

There were charged into a resin kettle equipped as in Example 2, 116.2 parts hexamethylene diamine, 62.79 parts azelaic acid, 136.94 parts TMA–EG and 34.20 parts cresol. About 39 parts xylene were placed in the trap to help remove the water. The mixture was heated at 190° C until the water stopped azeotropically distilling. The theoretical amount of water was removed along with the xylene. About 403 parts of cresol were added to this product to make a solution containing 40 percent solids.

Shown in Table IV below are certain reactions carried out using the product of Example 4. All of the following reactions were carried out in mixtures containing about 20 percent solids in a flask equipped with a stirrer, thermometer and a condenser with $N_2$ bypass. After heating from 80° to 110° C over 5–10 minutes, all gave a good flexible film on aluminum with curing 10 to 20 minutes at 250° C.

TABLE IV

| Example | Added Cresol | Ex. 4 | Ex. 4 solids | Curithane #103 | PMDA | BTDA | MA | Cutthru, °C. |
|---|---|---|---|---|---|---|---|---|
| 4a | 41.38 | 17.53 | 7.01 | 0.41 | | 2.6 | 0.4 | 300 |
| 4b | 37.08 | 17.53 | 7.01 | 0.41 | 1.74 | | 0.4 | 325 |

EXAMPLE 5

There were charged into a resin kettle equipped as in Example 2, 108.14 parts meta-phenylene diamine, 62.79 parts azelaic acid, 136.94 parts TMA–EG and 33.31 parts cresol. About 39 parts xylene were placed in the trap to help remove the water. The mixture was heated at 190° C until the water stopped azeotropically distilling. The theoretical amount of water was removed along with the xylene. About 392 parts of cresol were added to this product to make a solution containing 40 percent solids.

Shown in Table V below are certain reactions carried out using the product of Example 5. All of the reactions were carried out in mixtures containing about 20 percent solids in a flask equipped with a stirrer, thermometer and a condenser with $N_2$ bypass. After heating from 80° to 110° C over 5–10 minutes, all gave a good flexible film on aluminum with curing 10 to 20 minutes at 250° C.

TABLE V

| Example | Added Cresol | Ex. 5 | Ex. 5 solids | Curithane #103 | PMDA | BTDA | MA | Cutthru, °C. |
|---|---|---|---|---|---|---|---|---|
| 5a | 40.68 | 17.03 | 6.81 | 0.41 | | 2.6 | 0.4 | 340 |
| 5b | 36.38 | 17.03 | 6.81 | 0.41 | 1.74 | | 0.4 | 365 |

EXAMPLE 6

There were charged into a resin kettle equipped as in Example 2, 198.26 parts p,p'-methylene dianiline, 99.64 parts azelaic acid, 53.3 parts TMA–EG and 38.16 parts cresol. About 39 parts xylene were placed in the trap to help remove the water. The mixture was heated to 190° C until the water stopped azeotropically distilling. The theoretical amount of water was removed along with the xylene. About 452 parts of cresol were added to this product to make a solution containing 40 percent solids.

Shown in Table VI below are certain reactions carried out using the product of Example 6. All of the following reactions were carried out in mixtures containing about 20 percent solids in a flask equipped with a stirrer, thermometer and a condenser with $N_2$ bypass. After heating from 80° to 110° C over 5–10 minutes, all gave a good flexible film on aluminum with curing 10 to 20 minutes at 250° C.

There are provided, then, by the present invention new and useful polyamideimide materials and their precursor polyamic acids which are useful for providing films for electrical insulation and other purposes. They are also useful for coating substrates in general and are useful as adhesives in the preparation of laminates. In the divided state they can be used for molding purposes either unfilled or filled with the usual fillers.

TABLE VI

| Example | Added Cresol | Ex. 6 | Ex. 6 solids | Curi-thane #103 | PMDA | BTDA | MA | Cut-thru. °C, |
|---|---|---|---|---|---|---|---|---|
| 6a | 44.36 | 19.65 | 7.86 | 0.41 | | 2.6 | 0.4 | 280 |
| 6b | 40.04 | 19.65 | 7.86 | 0.41 | 1.74 | | 0.4 | 300 |

What we claim as new and desire to secure by Letters Patent of the United States is:

1. The product of reaction of (I) the reaction product of (a) aliphatic diacid, (b) material selected from tricarboxylic acid anhydride and esters of such anhydride, and (c) polyamine material and (II) organic dianhydride, aliphatically unsaturated organic anhydride, and polyamine including that having the formula

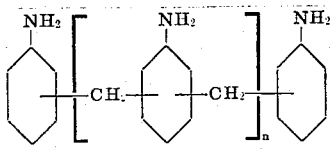

where $n$ is from about 0.1 to 10.

2. A product as in claim 1 where a portion of said aliphatic diacid is substituted with material selected from (a) aromatic acid and anhydride and mixtures thereof containing at least two groups selected from carboxyl and anhydride groups and (b) aliphatic anhydride.

3. A coating composition of the product of claim 1 in a compatible solvent.

4. A substrate coated with the cured product of claim 1.

5. A product as in claim 1 wherein said ester anhydride is 4,4'-ethylene-bis-anhydrotrimellitate.

* * * * *